United States Patent
Ku

(10) Patent No.: US 8,995,426 B2
(45) Date of Patent: *Mar. 31, 2015

(54) METHOD AND APPARATUS FOR PROVIDING CALL ROUTING IN A NETWORK

(71) Applicant: AT&T Intellectual Property I, L.P., Atlanta, GA (US)

(72) Inventor: Bernard Ku, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/970,246

(22) Filed: Aug. 19, 2013

(65) Prior Publication Data

US 2013/0329723 A1 Dec. 12, 2013

Related U.S. Application Data

(63) Continuation of application No. 12/272,348, filed on Nov. 17, 2008, now Pat. No. 8,514,838.

(51) Int. Cl.
*H04L 12/28* (2006.01)
*H04L 12/947* (2013.01)
*H04L 29/12* (2006.01)
*H04L 29/06* (2006.01)

(52) U.S. Cl.
CPC ............ *H04L 49/25* (2013.01); *H04L 29/1216* (2013.01); *H04L 61/157* (2013.01); *H04L 65/1069* (2013.01); *H04L 29/12132* (2013.01); *H04L 61/1552* (2013.01)
USPC ........................................................ 370/351

(58) Field of Classification Search
None
See application file for complete search history.

(56) References Cited

U.S. PATENT DOCUMENTS

| 7,283,516 | B1 | 10/2007 | Ganesan et al. |
| 8,514,838 | B2 | 8/2013 | Ku |
| 2003/0123637 | A1 | 7/2003 | Rangarajan et al. |
| 2005/0286531 | A1 | 12/2005 | Tuohino et al. |
| 2006/0072575 | A1* | 4/2006 | Miyajima et al. ............ 370/392 |
| 2006/0262917 | A1 | 11/2006 | Marsico |
| 2007/0133574 | A1 | 6/2007 | Tejani et al. |
| 2007/0147598 | A1 | 6/2007 | Somes et al. |
| 2008/0130856 | A1 | 6/2008 | Ku et al. |
| 2008/0137832 | A1 | 6/2008 | Heinze et al. |

* cited by examiner

*Primary Examiner* — Otis L Thompson, Jr.

(57) ABSTRACT

A method and an apparatus for providing call routing in a network are disclosed. For example, the method receives a signaling message for a call, and determines if the signaling message contains information for determining if routing of the call requires an ENUM (tElephone Numbering Mapping) query. The method then processes the call by bypassing the ENUM query if the signaling message contains the information.

20 Claims, 4 Drawing Sheets

METHOD AND APPARATUS FOR PROVIDING CALL ROUTING IN A NETWORK

This application is a continuation of U.S. patent application Ser. No. 12/272,348, filed Nov. 17, 2008, now U.S. Pat. No. 8,514,838, and is herein incorporated in its entirety.

The present invention relates generally to communication networks and, more particularly, to a method and apparatus for providing efficient call routing in a network, e.g., an Internet Protocol (IP) network, a Voice over Internet Protocol (VoIP) network, and the like.

BACKGROUND OF THE INVENTION

When a customer initiates a call, the call is routed to the network service provider for handling, where the call is processed and forwarded towards its destination. Generally, in processing the call, a number of processing steps is performed such as determining the call's termination (e.g., IP termination versus Public Switched Telephone Network (PSTN) termination). Many of these processing steps are performed irrespective of the type of calls that are being handled by the network service provider. However, performing these processing steps may not be useful for a particular call.

SUMMARY OF THE INVENTION

In one embodiment, the present invention discloses a method and an apparatus for providing call routing in a network. For example, the method receives a signaling message for a call, and determines if the signaling message contains information for determining if routing of the call requires an ENUM (tElephone Numbering Mapping) query. The method then processes the call by bypassing the ENUM query if the signaling message contains the information.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing efficient call routing in a network. Although the present invention is discussed below in the context of Internet Protocol (IP) Multimedia Subsystem (IMS) networks, the present invention is not so limited. Namely, the present invention can be applied to packet networks in general, e.g., Internet Protocol (IP) networks, Voice over Internet Protocol (VoIP) networks, Service over Internet Protocol (SoIP) networks, and the like.

Figure 1:
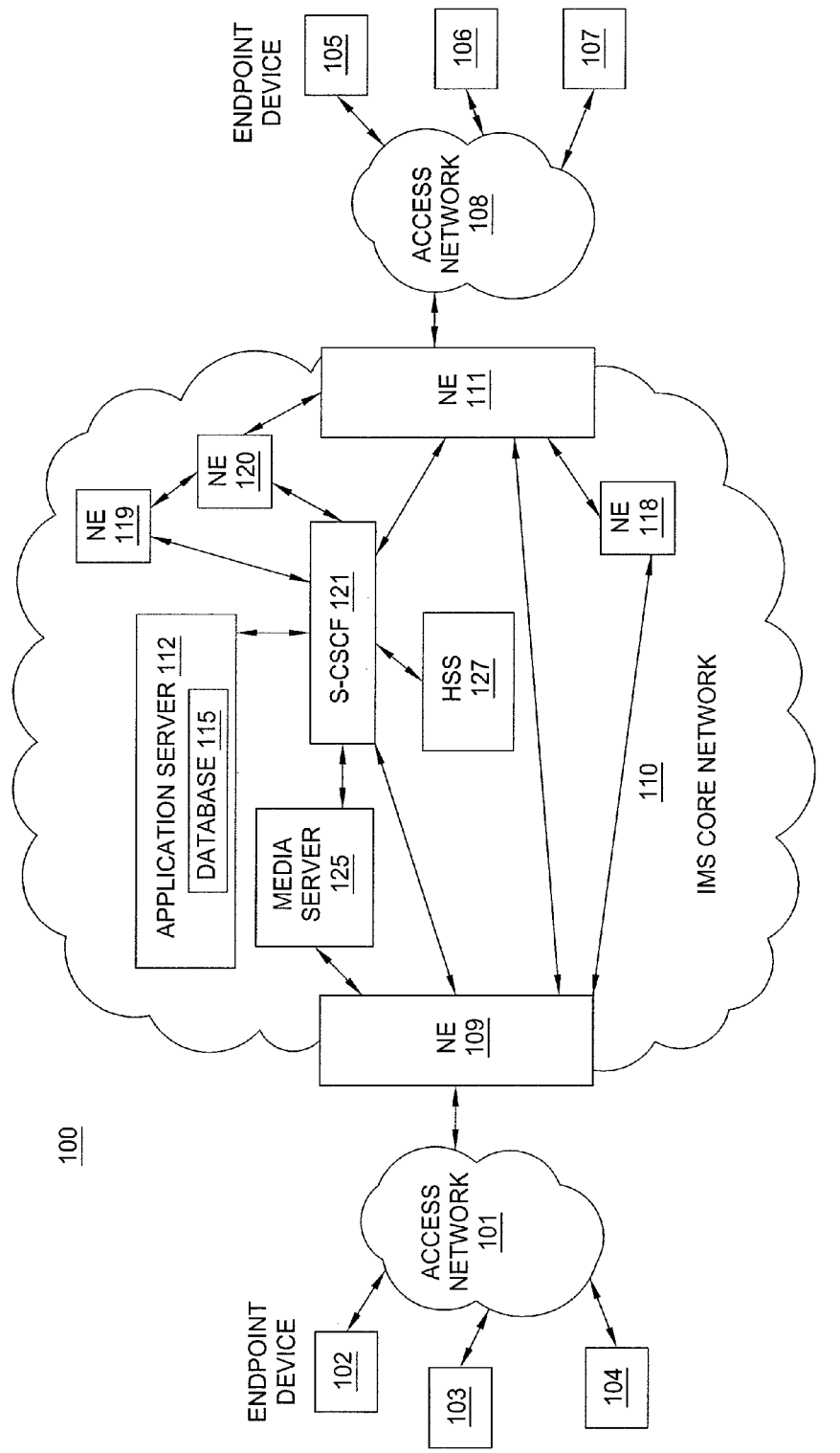
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving—Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice and data services are transmitted on IP Multimedia Subsystem (IMS) networks. When a customer initiates a call, the signaling message for the call is routed towards the service provider's network. An S-CSCF located in the provider's network processes the signaling message, and forwards the call towards its destination. In processing the call, a number of processing steps is performed such as determining the call's termination (e.g., IP termination versus Public Switched Telephone Network (PSTN) termination). Many of these processing steps are performed irrespective of the type of calls that are being handled by the network service provider. However, performing these processing steps may not be useful for a particular call.

For example, an S-CSCF may process all calls the same way whether the call is destined to an IP network or Public Switched Telephone Network (PSTN). In one example, the S-CSCF queries an ENUM server regardless of the network to which the call is destined.

In one embodiment, the current method provides efficient call routing in a network. Specifically, the current method provides a call routing method that includes bypassing the ENUM server if it is determined that an ENUM query is not needed to handle the call. In order to more clearly describe the current invention, the following networking terminologies are first provided.

E.164; and

ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM (tElephone NUmbering Mapping) refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa. An S-CSCF server may then query a DNS server to resolve on the domain name 4.3.2.1.5.5.5.7.8.9.1.e164.arpa.

As the example above illustrates, the ENUM query is useful when a call is routed to an IP endpoint by first transforming a phone number to a URI. However, if the call is destined to an endpoint in a Public Switched Telephone Network (PSTN), transforming a phone number to a URI may not be needed.

In one embodiment, the current method provides an efficient call routing, e.g., by bypassing ENUM query processing or handling. For example, the method first determines if a signaling message for a call contains a prefix that is used for determining whether or not the call routing requires an ENUM query.

In one embodiment, the S-CSCF may receive a signaling message that contains a Carrier Identification Code (CIC). If the signaling message contains a CIC, the S-CSCF will use the CIC to identify the carrier network to which the signaling message is to be forwarded (e.g., using the following illustrative format: sip:+12127654321;cic=+10288@domain; user=phone). That is, the S-CSCF will be able to handle the call without performing an ENUM query.

The signaling message may then be forwarded to the identified carrier network via a Border Gateway Control Function (BGCF). For example, if the call is intended for PSTN termination, the BGCF may forward the signaling message towards the PSTN network via a Media Gateway Control Function (MGCF). The MGCF may then convert the IP signaling message (e.g., Session Initiation Protocol message) to a signaling message for a switched network (e.g., Signaling System 7), and then forward the signaling system 7 message to a Signaling Gateway (SGW). The SGW may then provide the signaling interface to the PSTN. Note that searching for a URI would not have been a useful step since the call is destined to a circuit switched network, i.e., PSTN. Hence, bypassing the ENUM query for such calls enables the S-CSCF to be more efficient in routing calls. In other words, the interaction between the S-CSCF and an ENUM server is avoided, thereby increasing the speed of setting up the call and avoiding using network resources unnecessarily.

In one embodiment, the S-CSCF may receive a signaling message that includes an indication, wherein the indication indicates that an ENUM query if executed would result in the destination number being identified as a number that is not in service. For example, the caller may be aware that the called number is not available and the call may be intended to be handled in accordance with the called party's preference when the called party is unavailable. For example, the caller may know that the called party is unavailable and the call needs to be forwarded to an answering service. In another example, the caller may know that the called party has invoked a call forwarding feature, e.g., to a cell phone. The caller may then include a predetermined prefix (e.g., published by a service provider) in the signaling message such that the S-CSCF may use the predetermined prefix to identify the call as being directed towards a destination known to be unavailable. The S-CSCF may then process the call without an ENUM query. That is, the predetermined prefix may be used to make the S-CSCF aware that an ENUM query would not result in obtaining a URI. For example, the S-CSCF may forward the call directly to an answering service, a cellular network for a cell phone, etc. without the need for performing an ENUM query.

Figure 2:
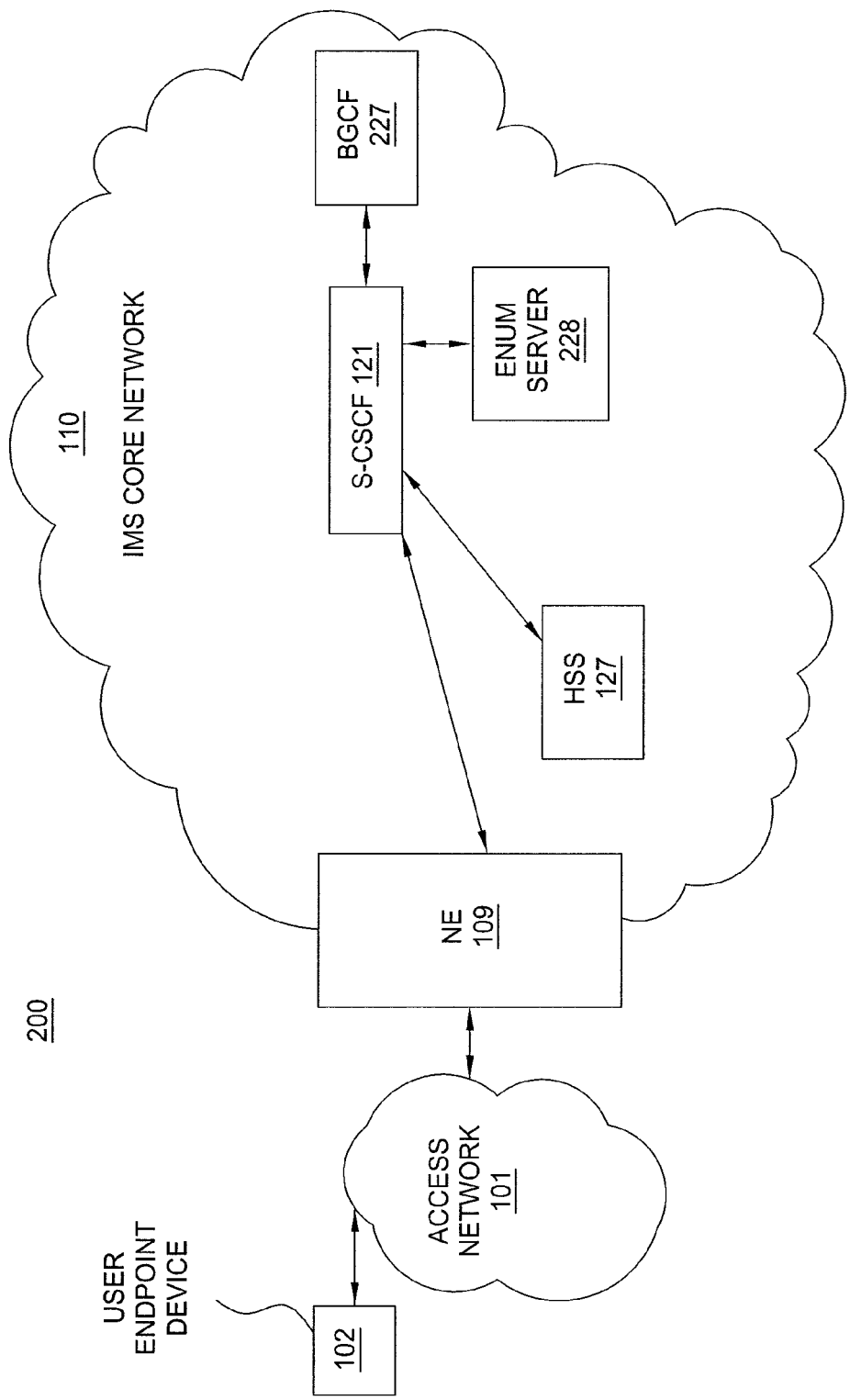
FIG. 2 illustrates an exemplary network in accordance with one embodiment of the current invention for providing efficient call routing.

FIG. 2 illustrates an exemplary network 200 in accordance with one embodiment of the current invention for providing efficient call routing. In one embodiment, the network 200 comprises a User Endpoint (UE) device 102 communicating with an IMS network 110 via an access network 101. The IMS network 110 comprises an HSS 127, an S-CSCF 121, an ENUM server 228, and a BGCF 227.

In one embodiment, the current method provides an efficient call routing in a network. For example, the method enables a customer to subscribe to a service with a capability for bypassing an ENUM query. For example, the customer may access a Home Subscriber Server (HSS) 127 located in the IMS network 110 and subscribes to the service. The HSS may then provide a predetermined prefix to the customer such that the customer is able to initiate calls with the signaling message containing the predetermined prefix.

The service provider then implements within an S-CSCF 121 a method for processing a signaling message by first identifying whether or not the call requires an ENUM query. For example, the method may first determine if the signaling message contains information (e.g., a CIC or a predetermined prefix for bypassing ENUM) that may be used to assess whether or not the routing of the call requires an ENUM query. If the call requires an ENUM query, the method queries the ENUM server 228 and uses a normal process for processing calls. The response to the ENUM query may comprise one of: a SIP-URI, an indication that the request is to be forwarded to the PSTN, an indication that the E.164 number is not in the queried ENUM domain, and an indication that the E.164 number is not in service. In one example, the ENUM query results in receiving a URI. The method may then replace the call signaling message (e.g., a SIP request) with a SIP-URI and routes the call towards the IP endpoint. In another example, the ENUM query may result in a response that indicates that the E.164 number is not in the queried ENUM domain. For example, a "no record found" response may be received from the ENUM server. The method may then route the request to the BGCF.

If the call requires no ENUM query, the method may then bypass ENUM. In one embodiment, the signaling message may contain a particular CIC identifying a specific carrier. The call may then be forwarded to the appropriate carrier via a BGCF 227. In another embodiment, the signaling message may contain the predetermined prefix indicating that an ENUM query would not result in a response that yields a URI. The method may then handle the call in accordance with the call handling procedures for the destination number. For example, the HSS 127 may include the called number's preference in handling incoming calls while the called number is unavailable, e.g., the called party is busy, the called party has powered off the phone, the called party has activated a "do not disturb" feature, and so on. The S-CSCF 121 may then consult with HSS 127 to determine the proper call handling process.

Figure 3:
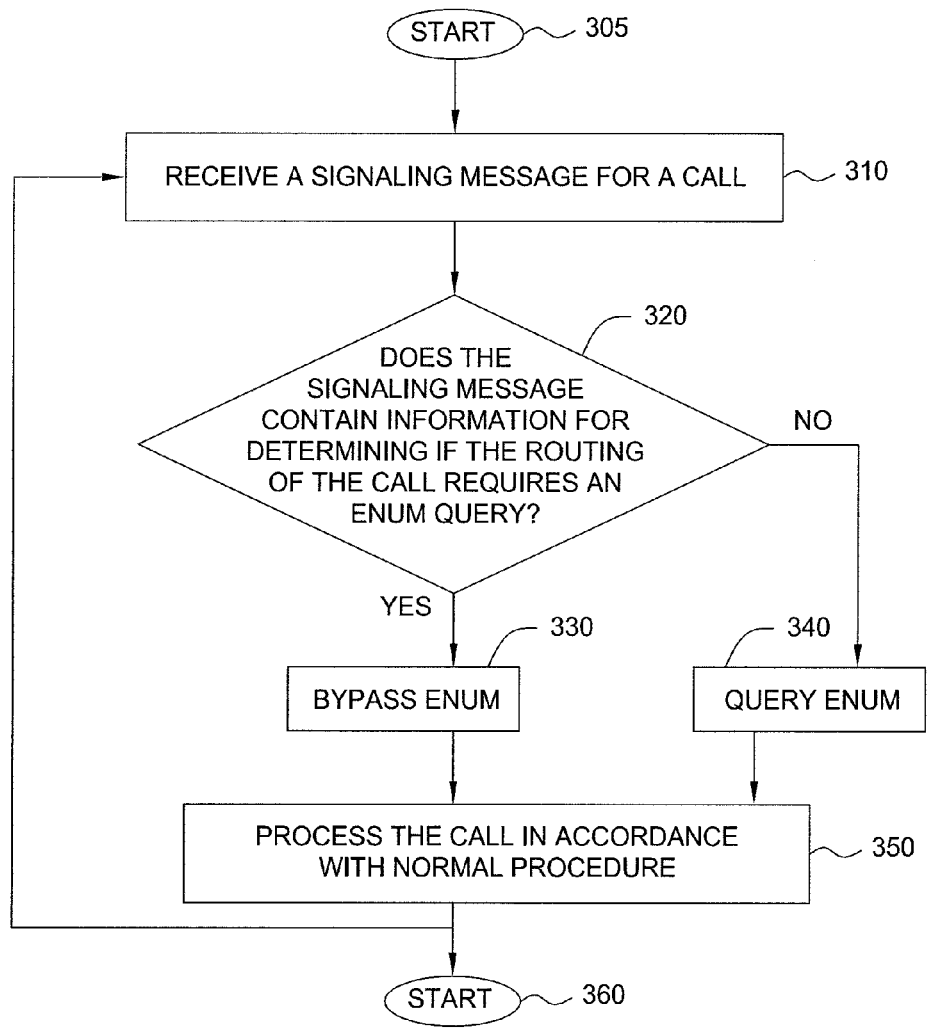
FIG. 3 illustrates a flowchart of a method for providing call routing in a network.

FIG. 3 illustrates a flowchart of a method 300 for providing call routing in a network. The current method provides efficient call routing by identifying calls that may bypass ENUM processing, i.e., processing such calls without issuing an ENUM query. For example, one or more steps of method 300 can be implemented in an S-CSCF. Method 300 starts in step 305 and proceeds to step 310.

In step 310, method 300 receives a signaling message for a call. For example, a Serving-Call Session Control Function (S-CSCF) receives a Session Initiation Protocol (SIP) signaling message for initiating a call.

In step 320, method 300 determines if the signaling message contains information indicating or for determining if the routing of the call requires an ENUM query. In one embodiment, the information for determining if the routing of the call requires an ENUM query may be a Carrier Identification Code (CIC). In another embodiment, the information for determining if the routing requires an ENUM query may be a predetermined prefix for bypassing ENUM query. If the signaling message contains information for determining if the routing requires an ENUM query (e.g., a predetermined prefix for bypassing ENUM and/or a CIC), the method proceeds to step 330. Otherwise, the method proceeds to step 340.

In step 330, method 300 bypasses ENUM processing. For example, the method skips the process of issuing an ENUM query for retrieving the URI of the destination endpoint for the call. The method then proceeds to step 350.

In step 340, method 300 queries an ENUM domain server. For example, the method may send a query to the ENUM domain server to retrieve a URI associated with an IP endpoint. For example, the call may be destined to an endpoint in the IP domain. The method then proceeds to step 350.

In step 350, method 300 processes the call in accordance with a normal procedure. For example, if the call is processed without an ENUM query, the method forwards the signaling message to a BGCF. In another example, if a URI is returned as a response to the ENUM query, the method replaces the URI with a SIP-URI (if SIP signaling is used) and routes the signaling message towards the IP endpoint. The method then ends in step 360 or returns to step 310 to continue receiving additional requests.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
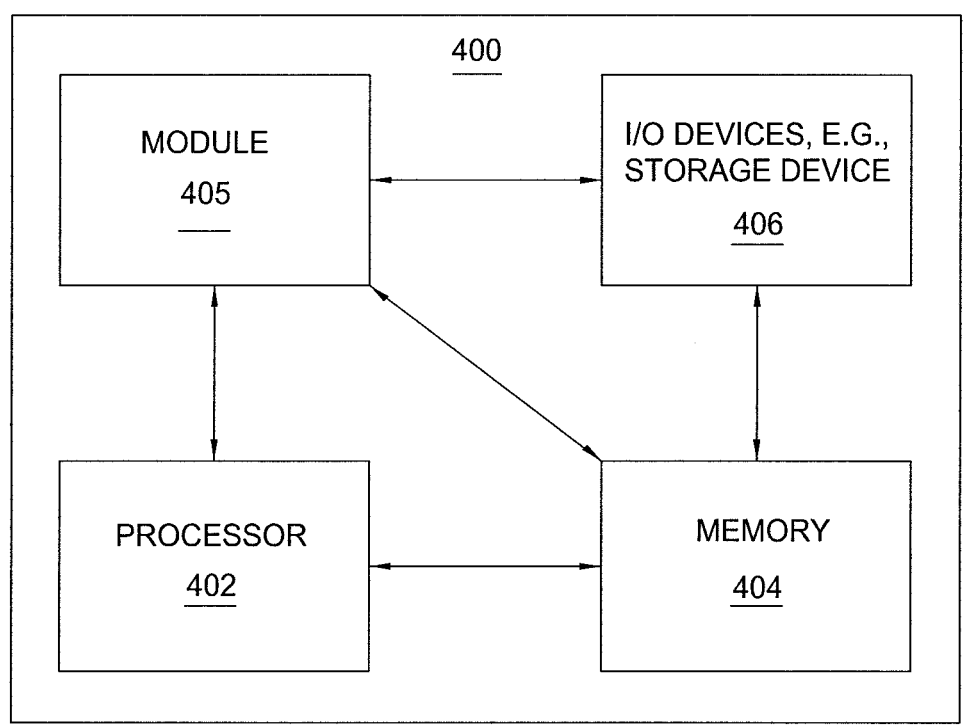
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing call routing in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing call routing in a network can be loaded into memory 404 and executed by processor 402 to implement the functions as discussed above. As such, the present method 405 for providing call routing in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a call in a network, comprising:
receiving, by a processor of a serving-call session control function, a signaling message for the call;
determining, by the processor, the signaling message contains information for determining whether routing of the call requires a telephone numbering mapping query, wherein the information comprises a carrier identification code, wherein the carrier identification code identifies a carrier to which the signaling message is to be forwarded, wherein the network comprises an internet protocol network; and
processing, by the processor, the call by bypassing the telephone numbering mapping query.

2. The method of claim 1, wherein the information further comprises a predetermined prefix for bypassing a telephone numbering mapping processing.

3. The method of claim 2, wherein the predetermined prefix is determined by a service provider.

4. The method of claim 1, wherein the signaling message comprises a session initiation protocol signaling message.

5. The method of claim 1, wherein the internet protocol network comprises an internet protocol multimedia subsystem network.

6. The method of claim 5, wherein the internet protocol multimedia subsystem network comprises a voice over internet protocol network.

7. The method of claim 1, further comprising:
forwarding the signaling message to the carrier as identified by the carrier identification code.

8. A non-transitory computer-readable medium storing a plurality of instructions which, when executed by a processor of a serving-call session control function, cause the processor to perform operations for processing a call in a network, the operations comprising:
receiving a signaling message for the call;
determining the signaling message contains information for determining whether routing of the call requires a telephone numbering mapping query, wherein the information comprises a carrier identification code, wherein the carrier identification code identifies a carrier to which the signaling message is to be forwarded, wherein the network comprises an internet protocol network; and
processing the call by bypassing the telephone numbering mapping query.

9. The non-transitory computer-readable medium of claim 8, wherein the information further comprises a predetermined prefix for bypassing a telephone numbering mapping processing.

10. The non-transitory computer-readable medium of claim 9, wherein the predetermined prefix is determined by a service provider.

11. The non-transitory computer-readable medium of claim 8, wherein the signaling message comprises a session initiation protocol signaling message.

12. The non-transitory computer-readable medium of claim 8, wherein the internet protocol network comprises an internet protocol multimedia subsystem network.

13. The non-transitory computer-readable medium of claim 12, wherein the internet protocol multimedia subsystem network comprises a voice over internet protocol network.

14. The non-transitory computer-readable medium of claim 8, further comprising:
forwarding the signaling message to the carrier as identified by the carrier identification code.

15. An apparatus for processing a call in a network comprising:
a processor of a serving-call session control function; and
a computer-readable medium storing a plurality of instructions which, when executed by the processor, cause the processor to perform operations, the operations comprising:
receiving a signaling message for the call;
determining the signaling message contains information for determining whether routing of the call requires a telephone numbering mapping query, wherein the information comprises a carrier identification code, wherein the carrier identification code identifies a carrier to which the signaling message is to be forwarded, wherein the network comprises an internet protocol network; and
processing the call by bypassing the telephone numbering mapping query.

16. The apparatus of claim 15, wherein the information further comprises a predetermined prefix for bypassing a telephone numbering mapping processing.

17. The apparatus of claim 16, wherein the predetermined prefix is determined by a service provider.

18. The apparatus of claim 15, wherein the signaling message comprises a session initiation protocol signaling message.

19. The apparatus of claim 15, wherein the internet protocol network comprises an internet protocol multimedia subsystem network.

20. The apparatus of claim 15, further comprising:
forwarding the signaling message to the carrier as identified by the carrier identification code.

* * * * *